United States Patent

[11] 3,596,266

| [72] | Inventors | Kenneth Leonard Slawson<br>Depew;<br>Robert Joseph Kellner, Cheektowaga, both of, N.Y. |
|---|---|---|
| [21] | Appl. No. | 744,490 |
| [22] | Filed | July 12, 1968 |
| [45] | Patented | July 27, 1971 |
| [73] | Assignee | Houdaille Industries, Inc.<br>Buffalo, N.Y. |

[54] NUMERICAL CONTROL SYSTEM AND METHOD
4 Claims, 9 Drawing Figs.

[52] U.S. Cl. .................................................. 340/347,
235/151.11, 318/574
[51] Int. Cl. ........................................................ H03k 13/02
[50] Field of Search.......................................... 340/347;
235/154, 92, 318/28

[56] References Cited
UNITED STATES PATENTS

| 3,099,777 | 7/1963 | Davis | 235/92 X |
| 3,183,421 | 5/1965 | Herchenroeder | 235/92 X |
| 3,414,718 | 12/1968 | McElroy | 235/92 |

*Primary Examiner*—Maynard R. Wilbur
*Assistant Examiner*—Gary R. Edwards
*Attorney*—Hill, Sherman, Meroni, Gross and Simpson

ABSTRACT: A control system having a stored program digital computer for transmitting commands to digital servos for a punch press with digital to analog converter circuitry providing for a digitally selected null zone, digital control of the slope of the analog error vs. count function for optimum slow down, and digital sensing of the null condition.

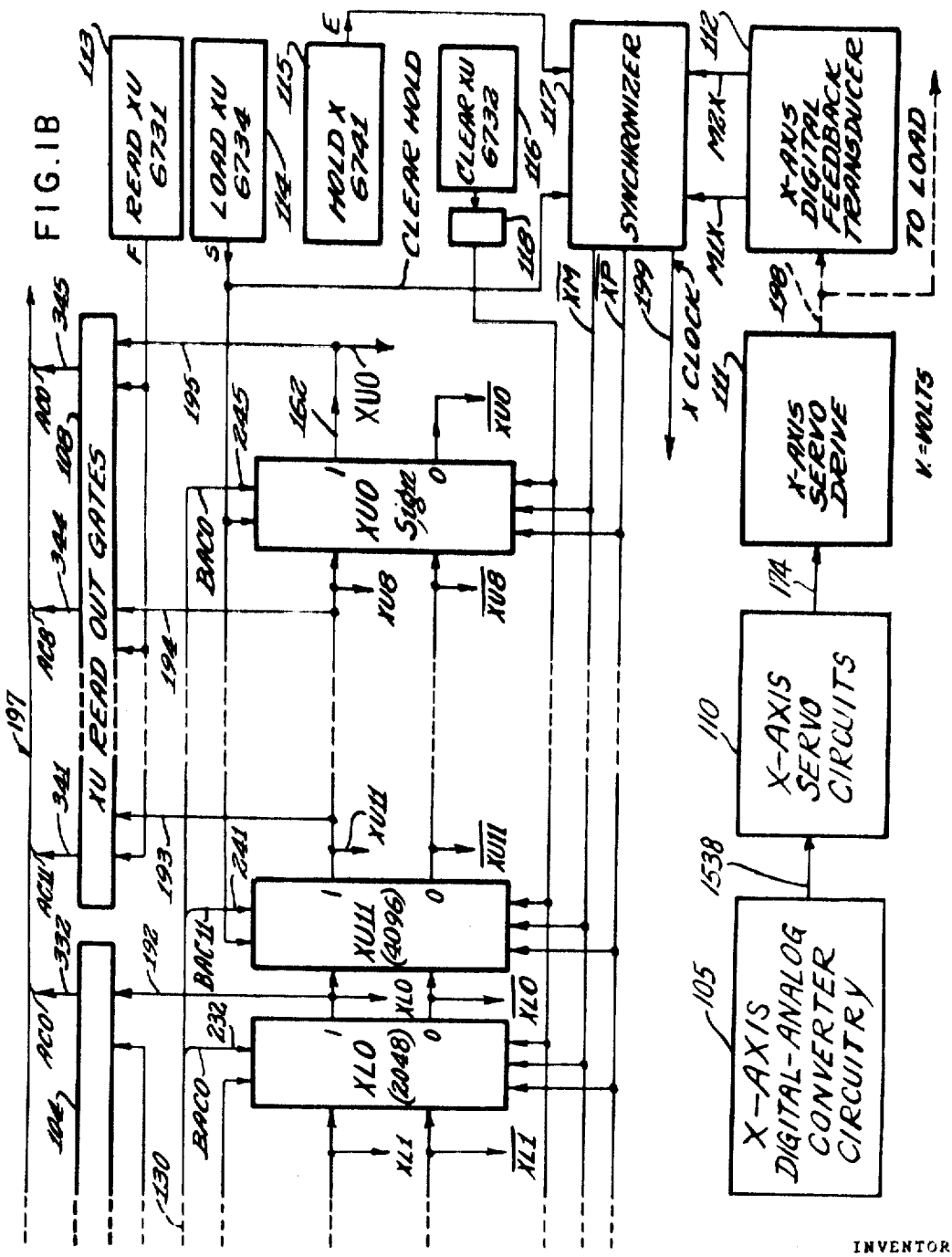

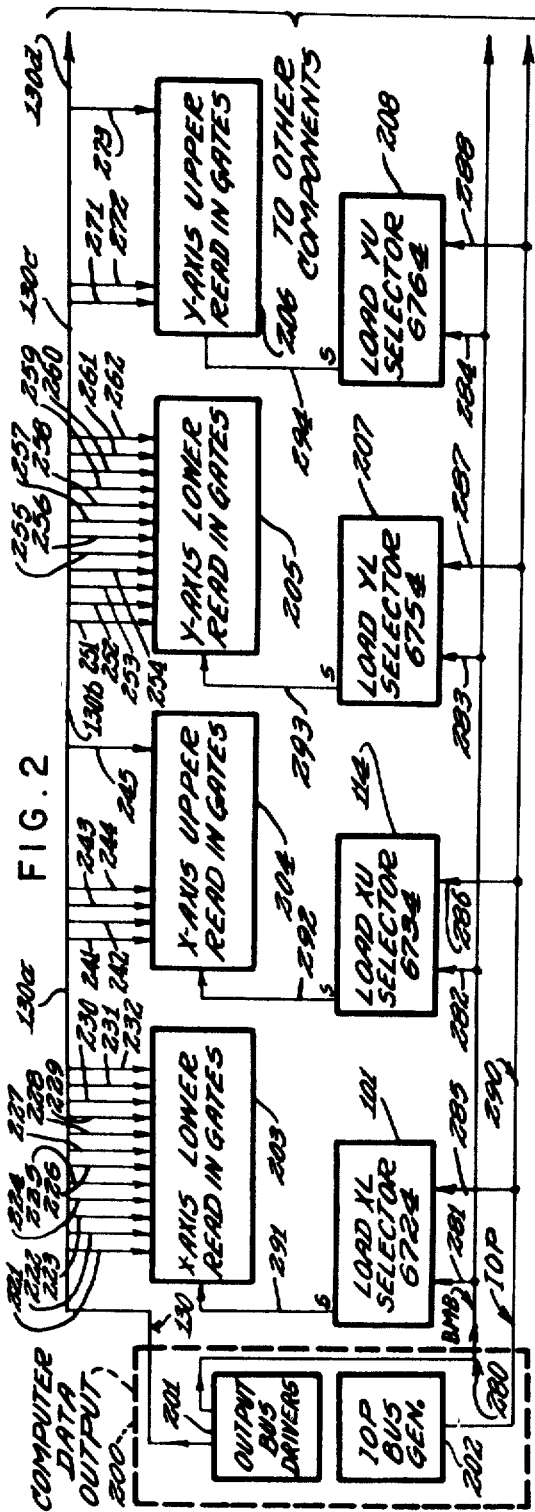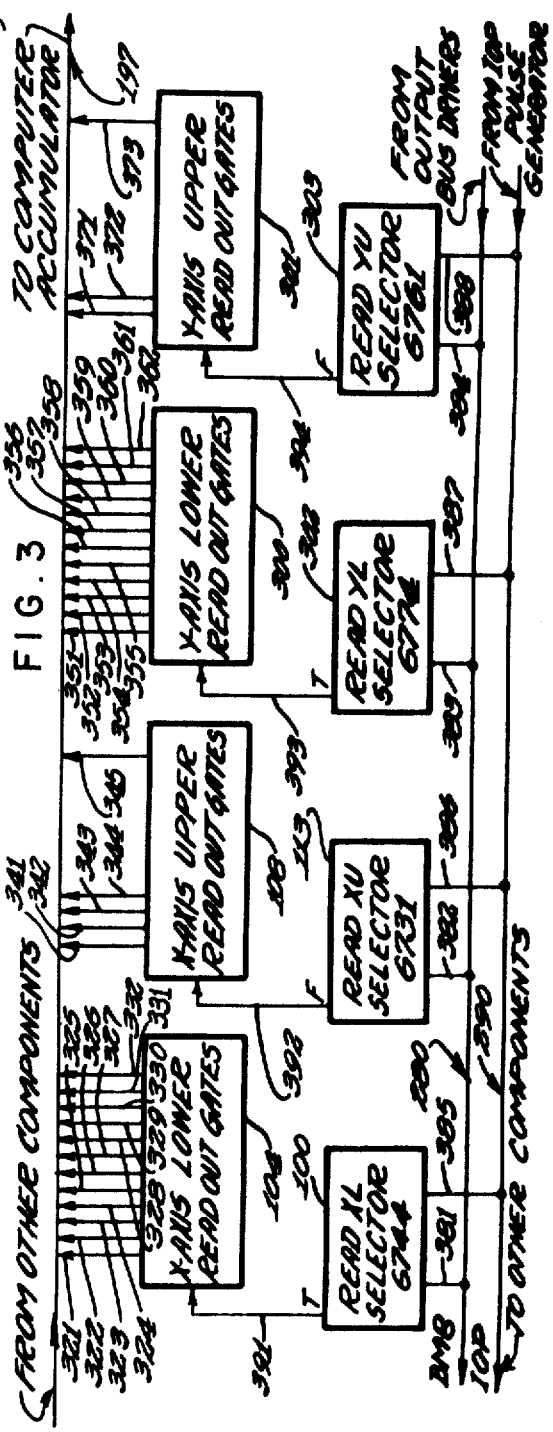

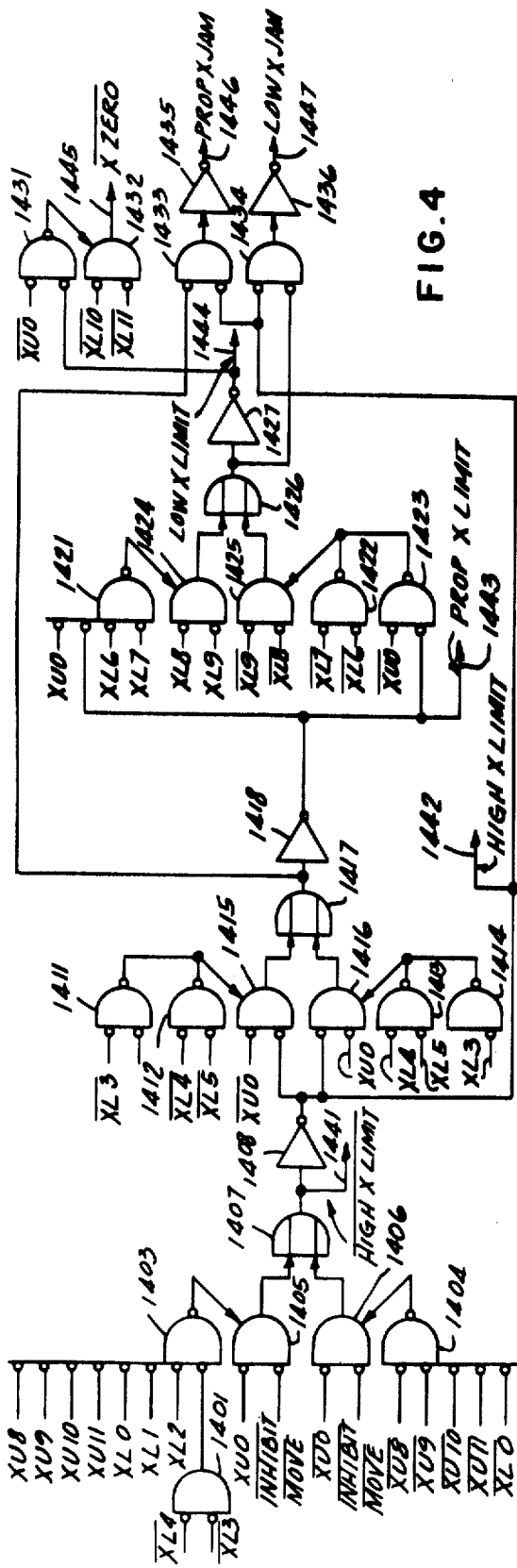
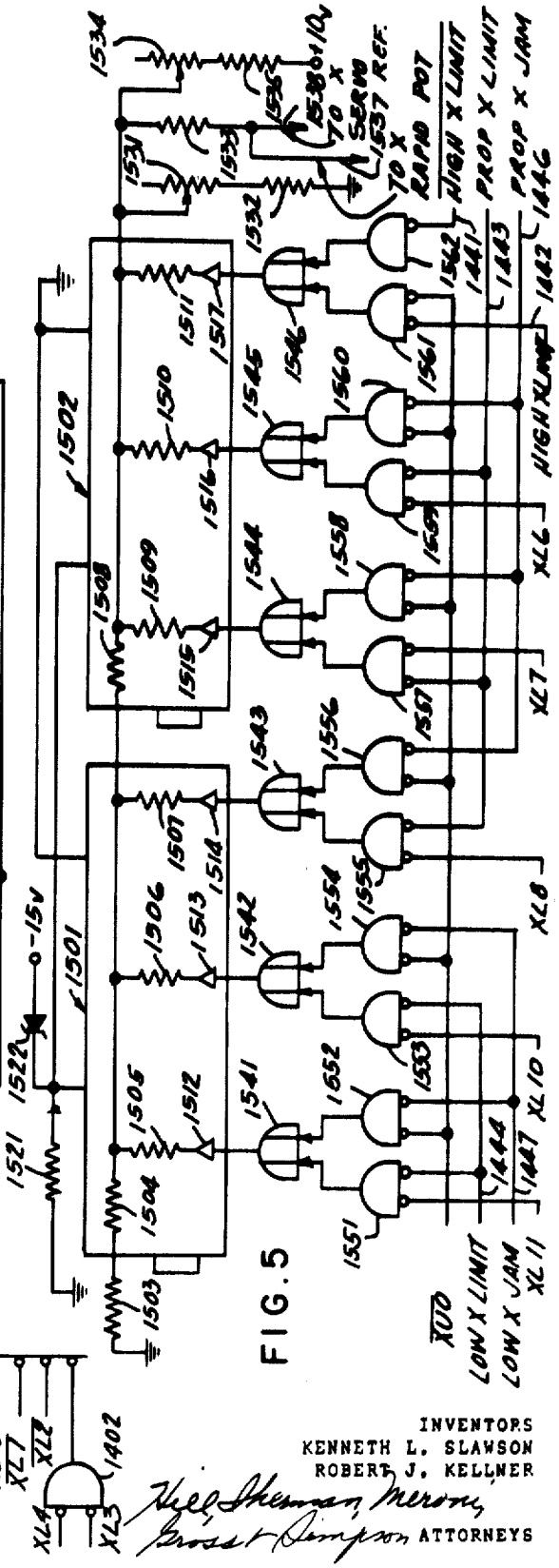
FIG. 4
FIG. 5

NUMERICAL CONTROL SYSTEM AND METHOD

CROSS-REFERENCES TO RELATED APPLICATIONS

The present application discloses specific improvements on the subject matter of copending application of Kenneth Leonard Slawson, U.S. Ser. No. 652,968 filed July 12, 1967, now abandoned which is assigned to the assignee of the present application, and the disclosure of said copending application is incorporated herein by reference. The present application relates to a commercial numerical control system which is disclosed in greater detail in a further commonly assigned application of Kenneth Leonard Slawson U.S. Ser. No. 744,392 filed July 12, 1968, and the disclosure of said further application is also incorporated herein by reference.

SUMMARY OF THE INVENTION

A basic objective of the present invention is to provide a substantially more reliable machine tool control system.

Another object of the invention is to provide a machine tool control system which is capable of convenient adjustment to respond to a desired digital null one.

A further object resides in the provision of a control system having a digitally responsive slow down characteristic which can be tailored for optimum positioning efficiency under different operating conditions.

BRIEF DESCRIPTION OF THE DRAWINGS

FIGS. 1A and 1B show the X-axis control circuits of a numerical positioning control system in accordance with the present invention, FIG. 1B being a continuation of FIG. 1A to the right, and dash lines being utilized to represent stages which have been omitted;

FIG. 2 is a diagrammatic illustration showing means for controlling the transfer of digital command signals from a stored program digital computer to the X and Y control circuits of a plurality of machine tools;

FIG. 3 is a diagrammatic illustration similar to FIG. 2 but showing the means for transferring data from the control circuits of the machines to the computer;

FIG. 4 is a logic diagram illustrating a portion of the converter circuitry for a system in accordance with the present invention;

FIG. 5 is a diagrammatic illustration of a further portion of the converter circuitry having extensive interconnections with FIG. 4;

DESCRIPTION OF THE ILLUSTRATED EMBODIMENT

Figure 1A:
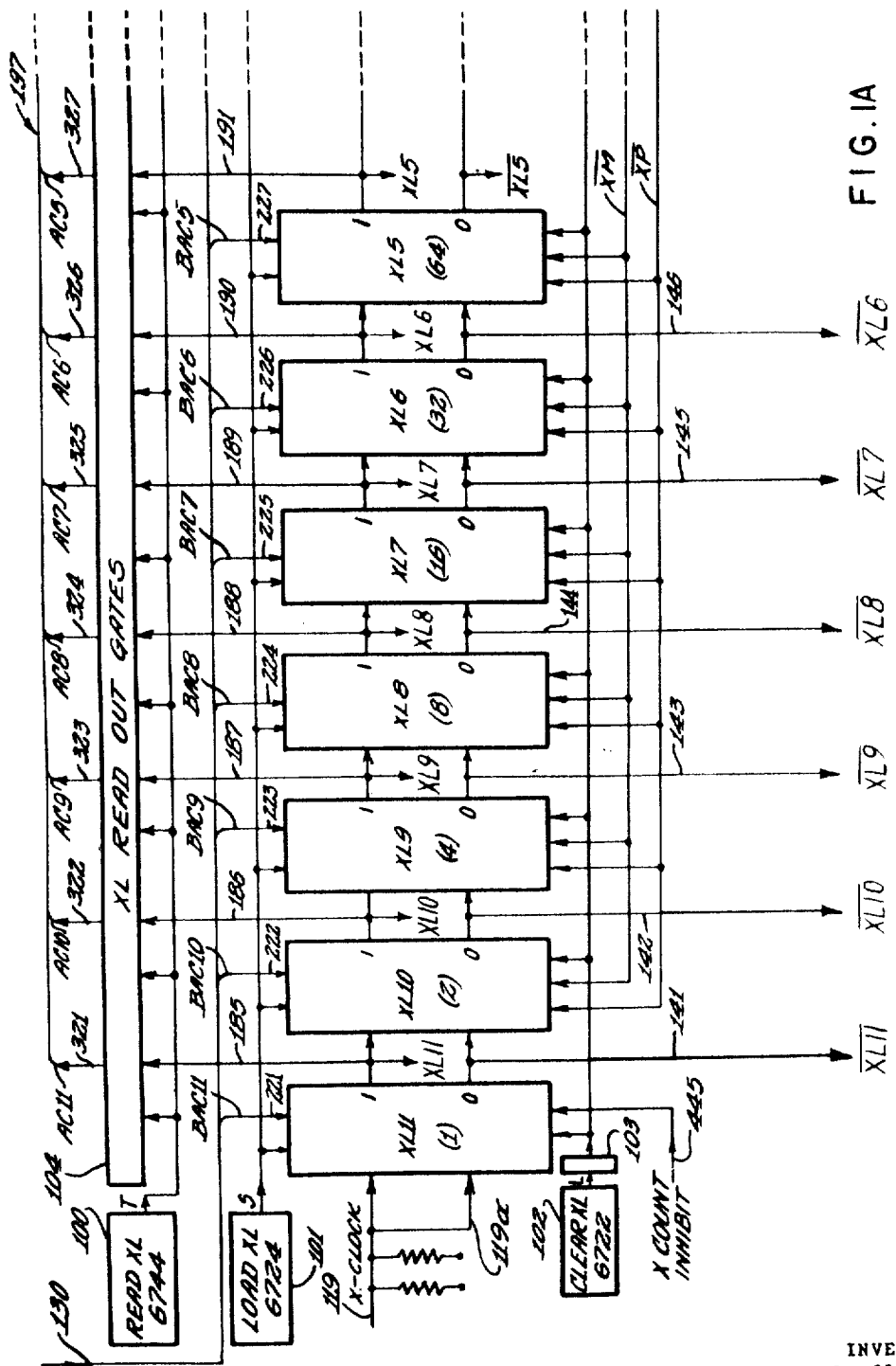

By way of introduction of the illustrated circuitry the components shown in FIGS. 1—8 of the drawings have been assigned respective general reference numerals, and a brief description of each such component is given in the following tabulations. The components of each figure have in general been assigned three or four digit reference numerals wherein hundreds digit of the reference numeral corresponds to the figure number, (the reference numerals in FIGS. 1A and 1B beginning at 100, those in FIG. 2 beginning with 200 and so forth) except that the same component appearing in successive drawing figures has received the same reference numeral. The tabulations also refer to a suitable commercial source where the component is commercially available, or otherwise identify or explain the structure of the component.

TABLES OF EXEMPLARY COMPONENTS

TABLE I (FIGS. 1A AND 1B)

Figure 6:
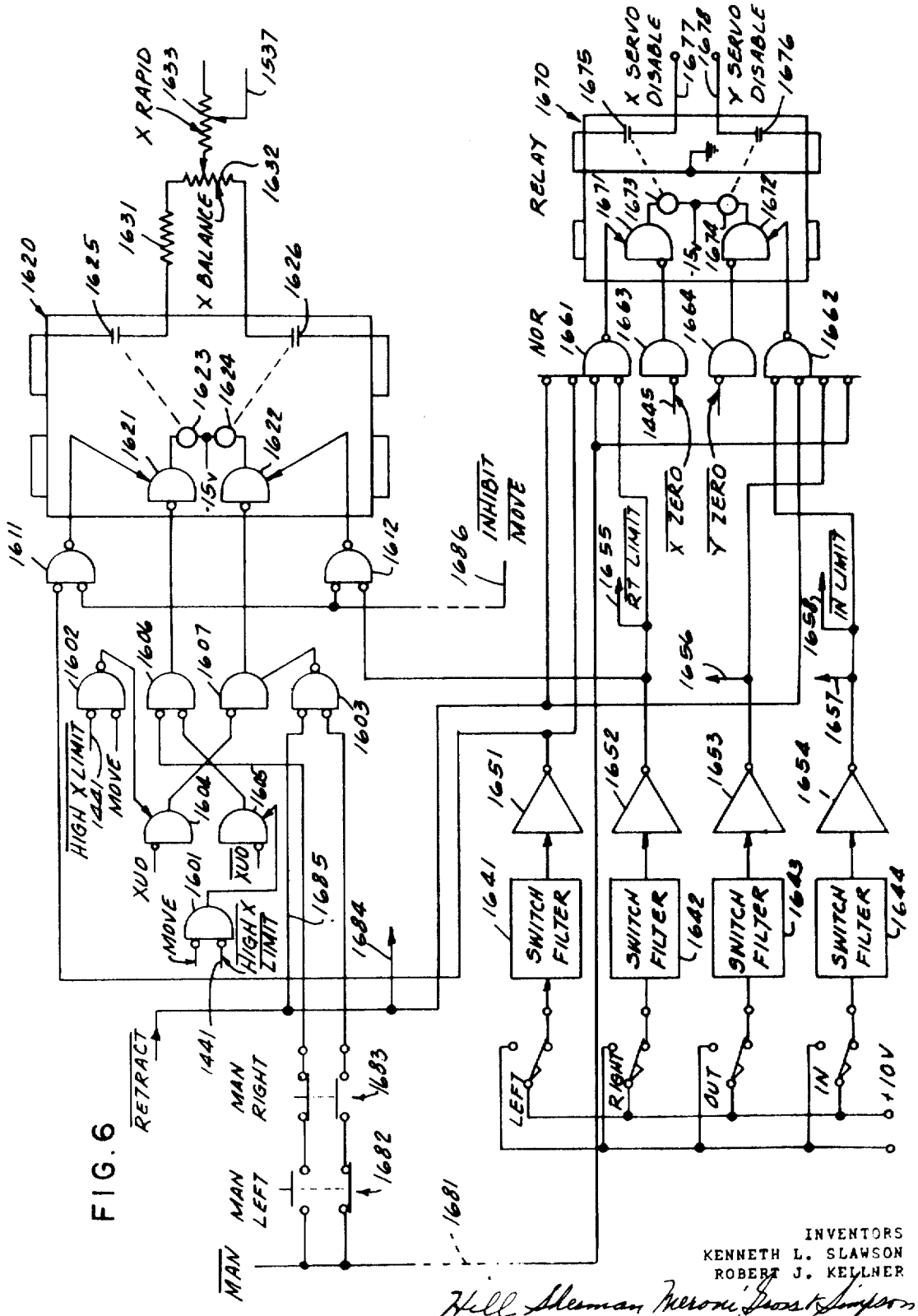
FIG. 6 illustrates diagrammatically servocontrol circuitry which is connected with the circuitry of FIG. 4.
Figure 7:
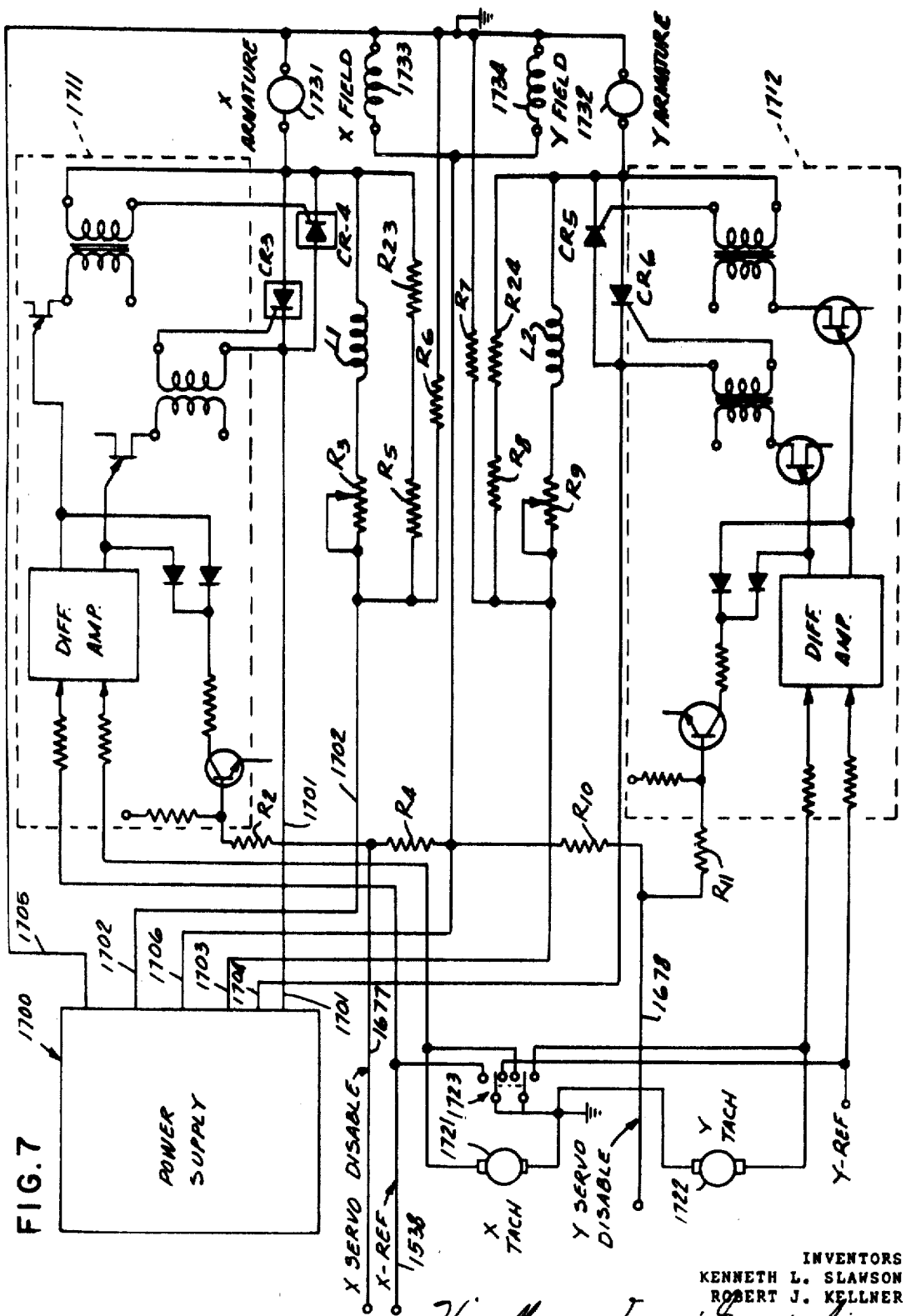
FIG. 7 is a diagrammatic illustration of servo circuits for the system.

| Reference character identifying component | Description of component | Reference to figure showing circuit, or identification of suitable commercial source [1] |
|---|---|---|
| XL0-XL11 | Binary Up-Down Counter. | R201 (17 required). |
| XU8-XU11, XU0. | (See DEC-A,[2] pages 39 and 40, which is incorporated herein by reference.). | |
| 100 | Read XL Selector (code 6744). | W103.[3] |
| 101 | Load XL Selector (code 6724). | W103. |
| 102 | Clear XL Selector (code 6722). | W103. |
| 103 | Pulse Amplifier | R602. |
| 104 | XL Read Out Gates | R123 (2 required) |
| 105 | Digital-Analog Converter circuitry. | Figs. 4-6. |
| 108 | XU Read Out Gates | R123. |
| 110 | X-Axis Servo Circuits | Figs. 7 |
| 111 | X-Axis Servo Drive. | Part of present numerically controlled positioning systems.[4] |
| 112 | X-Axis Feedback Transducer. | Do.[4] |
| 113 | Read XU Selector (code 6731). | W103. |
| 114 | Load XU Selector (code 6734). | W103. |
| 115 | Hold X Selector (code 6741). | W103. |
| 116 | Clear XU Selector (code 6732). | W103 |
| 117 | Synchronizer (X-Axis). | See the fourth Figure of the referenced Slawson applications |
| 118 | Pulse Amplifier. | R602. |

[1] Available as a module with the indicated designation from Digital Equipment Corporation, Maynard, Mass., USA unless otherwise specified.
[2] DEC-A referes to The Digital Logic Handbook published by Digital Equipment Corporation, 1967 Edition (404 pages).
[3] One is required unless otherwise specified. In certain instances a commercial component will contain duplicate circuits.
[4] For further details see the referenced Slawson applications

TABLE II (FIGURE 2)

| Component ref. No. | Component description | Identification of suitable source [1] |
|---|---|---|
| 200 | Computer Data Output Circuits (See DEC-B,[2] which is incorporated herein by reference.) | Part of PDP 8/S |
| 201 | Output Bus Drivers. | Do. |
| 202 | IOP (Input-Output Pulse) Pulse Generator. | Do. |
| 203 | X-Axis Lower Read-In Gates | Part of R201 (12 required) |
| 204 | X-Axis Upper Read-In Gates. | Part of R201 (5 required) |
| 205 | Y-Axis Lower Read-In Gates. | Part of R201 (12 required) |
| 206 | Y-Axis Upper Read-In Gates. | Part of R201 (3 required) |
| 207 | Load YL Selector (Code 6754). | W103 |
| 208 | Load YU Selector (Code 6764). | W103. |

[1] Available from Digital Equipment Corporation unless otherwise specified.
[2] DEC-B refers to The Digital Small Computer Handbook published by Digital Equipment Corporation, 1967 Edition (494 pages).

TABLE III (FIGURE 3)

| Reference number identifying component | Description of component | Identification of suitable DEC [1] module |
|---|---|---|
| 300 | Y-Axis Lower Read Out Gates | R123 (2 required) |
| 301 | Y-Axis Upper Read Out Gates | R123. |
| 302 | Read YL Selector (Code 6774) | W103 |
| 303 | Read YU Selector (Code 6761) | W103 |

[1] DEC is used herein to refer to the Digital Equipment Corporation, Maynard, Massachusetts, U.S.A.

TABLE IV (FIGURE 4)

| Component ref. No. | Component description | DEC module designation |
|---|---|---|
| 1401, 1402 | NAND Gates | R113 |
| 1403, 1404 | Diode Networks | R002 |

TABLE IV (FIGURE 4)—Continued

| Component ref. No | Component description | DEC module designation |
|---|---|---|
| 1405, 1406 | NAND Gates | R111 |
| 1407 | (Conductors from 1405 and 1406 connected directly to input of 1408) | |
| 1411-1414 | Diode Networks | R002 |
| 1415, 1516 | NAND Gates | R111 |
| 1417 | (Outputs of 1415 and 1416 connected to input of 1418) | |
| 1408, 1418 | Inverters | R111 |
| 1421-1423 | Diode Networks | R002 |
| 1424, 1425 | NAND Gates | R111 |
| 1426 | (Outputs of 1425 and 1425 connected directly to the input of 1427) | |
| 1427 | Inverter | R111 |
| 1431 | Diode Network | R002 |
| 1432-1434 | NAND Gates | R111 |
| 1435, 1436 | Inverters | R107 |

TABLE V (FIG. 5)

| Component ref. No. | Component description | DEC module designation |
|---|---|---|
| 1501, 1502 | Converter Stages | A601 |
| 1503-1511 | Resistance values of 1,000 ohms, 7,000 ohms, 8,000 ohms, 4,000 ohms, 2,000 ohms, 7,000 ohms, 8,000 ohms, 4,000 ohms, and 2,000 ohms, respectively. | |
| 1512-1517 | Amplifiers | |
| 1521 | Resistance value of 100 ohms, two watts. | |
| 1522 | Zener Diode 1N3732 | |
| 1531 | X gain potentiometer, 0 to 1,000 ohms, two watts. | |
| 1532 | Resistance value 330 ohms, one half watt. | |
| 1533 | Resistance value 1,000 ohms, one half watt. | |
| 1534 | X Zero potentiometer, 0 to 500 ohms, two watts. | |
| 1535 | Resistance value 1,800 ohms, one half watt. | |
| 1541-1546 | A direct conductive connection is utilized to perform the logical "OR" function as in Fig. 14. | |
| 1551-1562 | NAND Gates | R111 |

TABLE VI (FIGURE 6)

| Component ref. No. | Component description | DEC module designation |
|---|---|---|
| 1601-1603 | Diode Networks | R002 |
| 1604-1607 | NAND Gates | R111 |
| 1611, 1612 | Diode Networks | R002 |
| 1620 | Relay Circuit | W800 |
| 1621, 1622 | NAND Gates | |
| 1623, 1624 | Relay Energizing Coils | |
| 1625, 1626 | Normally open contacts of relays 1623 and 1624 respectively. | |
| 1631 | Resistance value 1,500 ohms, one half watt | |
| 1632 | X balance potentiometer, zero to 1,000 ohms, two watts. | |
| 1633 | X rapid potentiometer, zero to 10,000 ohms, two watts | |
| 1641-1644 | Switch Filters | W700 |
| 1651-1654 | Inverters | R107 |
| 1661, 1662 | Diode Networks | R002 |
| 1663, 1664 | NOR Gates | R111 |
| 1670 | Relay | W800 |
| 1671, 1672 | NAND Gates | |
| 1673, 1674 | Relay Coils | |
| 1675, 1676 | Normally open contacts or relays 1673 and 1674, respectively. | |

TABLE VII (FIGURE 7)

| Component Ref. No. | Component description | DEC module designation |
|---|---|---|
| 1,700 | Transformer with 117 volt alternating current primary, 2.3 kilovolt ampere. | |
| 1701, 1702 | Conductors connected to terminals of secondary winding of 1700 with a filter connected across the secondary winding between 1701 and 1702. | |
| 1703, 1704 | Conductors connected to opposite terminals of a secondary winding with filter thereacross. | |
| 1705, 1706 | Conductors connected to opposite terminals of a full wave rectifier energized by a secondary winding of the transformer of 1700 so that conductor 1706 is of negative polarity. | |
| 1711, 1712 | Servo preamplifiers | A-110973* |
| 1721, 1722 | X and Y tachometers | |
| 1723 | Balance switch | |

TABLE VII (FIGURE 7)—Continued

| Component Ref. No | Component description | DEC module designation |
|---|---|---|
| R2, R11 | Resistance values 2,000 ohms each, two watts. | |
| R4, R10 | Resistance values 4,000 ohms each, five watts. | |
| R3, R9 | Potentiometer, zero to 2,500 ohms, ten watts. | |
| L1, L2 | Inductance values, 4.5 henries each | |
| R5, R23, R8, R24 | Resistance values 1,500 ohms each, two watts. | |
| R6, R7 | Resistance values 3 ohms each, 100 watts. | |
| CR-3, CR-4, CR-5 and CR-6. | Controlled rectifiers 2N686 | |
| 1731, 1732 | X and Y armatures | |
| 1733, 1734 | X and Y fields | |

*Supplied by Hughes Aircraft Company.

TABLE VIII (FIGURE 8)

| Component Ref. No. | Component description | DEC module designation |
|---|---|---|
| 1801 | MOVE Flip-Flop | R203 |
| 1802 | NAND Gate | R111 |
| 1803 | Diode Network | R002 |
| 1804 | Diode Network | R001 |
| 1805 | Clamped Load | W005 |
| 1811 | Pulse Amplifier | R602 |
| 1812 | Clamped Load | W005 |
| 1813 | Delay (One Shot) ($C_9$ = 38 microfarad) | R302 |

Operation of FIGS. 1A and 1B

In operation of the components of FIGS. 1A and 1B, digital command signals from the accumulator (AC) of the computer are supplied via bus cable 130. As indicated by reference characters applied to conductors branching from the cable 130, the input gates of counter stages XL11 and XU11 are connected with the BAC11 output from component 201, FIG. 2, of the computer output circuits 200, which thus constitutes a source of digital command signals. The read in gates for stages XL11 through XLO are represented by block 203 in FIG. 2, and the read in gates for stages XU11, XU10, XU9, XU8 and XU0 are represented by component 204 in FIG. 2. The BAC10 terminal of the computer is connected with stages XL10 and XU10, the terminal BAC9 is connected with XL9 and XU9, and the terminal BAC8 is connected with XL8 and XU8. The terminals BAC7 through BAC1 are connected with counterstages XL7, XL6, XL5, XL4, XL3, XL2 and XL1, respectively. The BACO terminal of the computer is connected with the input gate of counterstage XL0 and also with the input gate of counterstage XU0, both shown in FIG. 1.

Thus, when the load XL component 101 is selected by virtue of the output of component 201, FIG. 2, the gates 203, FIG. 2, will be enabled to load digital command signals from the computer into the XL counting stages. Similarly when the load XU component 114 is selected, digital command data will be loaded into the XU counting stages of FIG. 1B.

When a positioning cycle is then initiated, an analog error signal will be generated at the output 1538 of the digital to analog converter circuitry 105 which will determine the direction and speed of operation of the X-axis servodrive 11. As shown in FIG. 1A, the complement outputs of stages XL11—XL6 are supplied via lines 141—146. These lines are connected to the inputs of the converter circuitry 105. The circuitry specifically referred to in Table 1 is such that when XL11 is clear, conductor 141 is held at minus 3 volts. On the other hand, when the counting stage XL11 is set, the output at line 141 is at ground potential.

Because of the operation of the null detector in circuitry 105 it is possible for the machine axis to come to a stop with a count other than zero registered in the counting stages. The count remaining in the counting stages may be determined so as to be well within the tolerance requirements of the machine tool, and yet with many successive positioning steps, it is conceivable that the absolute error of a later end point with respect to a fixed reference point would be unacceptable. To deal with this possibility, provision is made for the computer to read the condition of the counting stages when the axis has stopped. The computer could be programmed in a number of different ways to take care of the problem, but in the illustrated embodiment, provision is made for the computer processor to algebraically combine the remainder in the counting stages with a succeeding command so as to provide a modified command signal for the control circuits which will correct for the error in the previous positioning operation.

For the purpose of determining the condition of the counting stages after the machine axis has stopped, the counting stages are provided with output lines such as those indicated at 186—195 leading from the set output lines of stages XL11—XL5, XL0, XU11, XU8 and XU0. Similar output lines would provided for stages XL4, XL3, XL2, XL1, XU10 and XU9. The XL output lines such as 185--192 lead to an XL Read Out Gates component 104 controlled by a Read XL component 100. The XU Read Out Gates component 103 receives the output lines such as 193—195 of the XU counting stages and is controlled by the Read XU component 113. As indicated by the reference characters applied to the output lines of the XL Read Out Gates component 104, cable 197 connects with terminals AC11 through AC0 of the computer accumulator. Similarly the output lines from the XU Read Out Gates component 108, FIG. 1B, lead to terminals AC11, AC10, AC9, AC8 and AC0, respectively. The gate components 104 and 103 are of course, enabled on different cycles so that the computer can distinguish the AC11 output of gate 104 from AC11 output of gate 108, for example.

In the foregoing description, certain output lines which connect with the same terminal of the computer have been identified with a reference character indicating this fact. Specifically the designations AC0 through AC11, and BAC0 through BA11 have this significance. Individual reference numerals have also been applied to the respective conductors bearing the more general reference character designations. It is believed that this procedure will facilitate comprehension of the drawings by those skilled in the art Similarly in the following description the outputs from the XL and XU counting stages have been designated by the same reference characters as used for the respective counting stages. Thus, in FIG. 1A, an output line from the "set" output terminal of counterstage XL5 has been designated by the reference character XL5, while the output from the "clear" terminal of counting stage XL5 has been designated with the symbol for the complement of XL5 ($\overline{XL5}$). (Referring to FIG 1A, it will be observed that line 191 is connected to a common circuit point with line XL5 at the "set" output of counting stage XL5.)

Referring to the lower part of FIG. 1B, the output line 174 from servo circuits 110 is connected to the input of the X-axis servodrive component 111 whose mechanical output is indicated by dash line 198. The transducer component 112 may be of the photoelectric type and include a suitable preamplifier so as to supply square waveform signals at the output lines M1X and M2X leading to synchronizer 117. The synchronizer component will enable the line designated as the complement of XM ($\overline{XM}$) if the transducer is rotating in one direction and will enable the line designated as the complement of XP ($\overline{XP}$) if the transducer is being driven in the opposite direction. The synchronizer 117 will also supply an X clock pulse or motion pulse at line 199 for each increment of rotation of the transducer 112 By way of example, the transducer may be mechanically coupled to the output shaft 198 in such a way as to produce an X clock pulse for each increment of rotation corresponding to a linear displacement of the machine axis of 0.001 inch. The X clock pulses from the synchronizer are supplied to the input of counting stage XL11 which is arranged so that each clock pulse causes the counting stage to change its state. The stage XL11 thus acts in the manner of a toggle switch or binary counting stage. If the line $\overline{XM}$ is enabled, the counting stages will count in the "up" or positive direction. On the other hand if the line $\overline{XP}$ is enabled, the "set" output of each counting stage is effectively coupled to the next succeeding counting stage so that the counting stages will count in the "down" or minus direction The Hold X component 115 causes synchronizer 117 to interrupt the supply of X clock pulses for a sufficient interval to ensure that the counting stages may be inspected by the computer. The "hold" interval introduced by actuation of component 115 is sufficiently short, however, so that any feedback pulse from transducer 112 which might occur during this interval could only be blocked for a portion of its duration Thus even if a slight movement of the feedback transducer occurred during the hold interval, the count in the counting stages would reflect such movement. (Further details of the "Hold X" operation will be apparent from the referenced Slawson applications.)

After the computer has read out the condition of the counting stages with the machine axis essentially stopped, the computer will actuate Clear XL component 102 and the Clear XU component 116 to reset the counter to a zero reading in preparation for the transfer of a new digital command signal. Of course, if the read out from the counter shows an error in excess of tolerance, the computer may be programmed to delay clearing the counter, and to enable the servo drives for an additional interval.

Operation of FIGS. 3 and 3

In FIG. 2, the BAC output bus 130 has been indicated as leading to input conductors 221—232 of gate component 203. These same reference numerals have been applied in FIG. 1A and FIG. 1B to assist in correlation of these figures. Input conductors 221—227 as shown in FIG. 1A are also designated by reference characters BAC11 through BAC5 to indicate that these conductors are connected by means of cable 130 with terminals BAC11 through BAC5 of component 201, FIG. 2. Similarly, conductor 232 in FIG. 1B has also been designated by the reference character BAC0 which is the terminal to which this conductor connects at component 201 The input conductors to gate component 204 in FIG. 2 have been designated by reference numerals 241—245 and lead, respectively, to terminals BAC11, BAC10, BAC9, BAC8 and BAC0 In practice, the cable 130 may lead to a connector at the component 203, and a further cable such as indicated at 130a may lead from component 203 to component 204, while cable 130b may lead from component 204 to component 205, cable 130c may lead from component 205 to 206, and cable 130 d may lead to a further component of a second machine tool, for example. By actuating components 203, 204, 205, 206 and subsequent corresponding components in sequence, a desired number of components may all connect with terminals BAC11 through BAC0 of component 201. Thus, conductors 251 - 262 of gate 205 would connect with terminals BAC11 through BAC0 of component 201 and conductors 271—273 of component 206 would connect with terminals BAC11, BAC10 and BAC0 of component 201.

The manner of selection of gates such as 203- 206 in sequence is explained in detail in *The Digital Small Computer Handbook* (cited in Table II. supra) at pages 429 and 430, and a specific circuit is disclosed for components 101, 114, 207, and 208 in *The Digital Logic Handbook* (cited in Table I, supra) at page 142, and these disclosures are incorporated herein by reference. In general, the BMB cable 280 from component 201 (or two multiconductor cables as represented by line 280) may contain at least 12 conductors. Lines 281 284 may represent connections from one of each of six pairs of conductors of cable 280 to components 101, 114, 207 and 208, for example. The memory buffer register of the computer may have bits 3—8 thereof connected at both the binary 1 and binary 0 outputs thereof to the component 201, and cable 280 may connect with terminals MB3(1) through MB8(1) and MB3(0) through MB8(0) of component 201. The corresponding outputs of component 201 would be BMB3(1) through BMB8(1) and BMB3(0) through BMB8(0). It may be noted that the convention used for the selectors herein is to use the middle two digits of the code numbers of the selectors to indicate the octal complement of the BMB selection pattern. The final digit indicates whether an 10T1, 10T2 or 10T4 pulse is supplied. The initial 6 in the code indicates an input/output selection signal. Thus the selector 101 with a code of 6724 would be addressed on BMB cable 280 by a selection code of 72 (octal), with the final digit 4, indicating that an 10T4 is to be transmitted. Thus, taking the selection code for component 101 as 72 (octal), the following terminals would be connected to component 101 via cable 281 BMB3(0), BMB4(0), BMB5(0) and BMB6(1), BMB7(0), BMB8(1) To give one further example, if the code for component 114 is 73 (octal), then cable 282 would connect with the following terminals: BMB3(0), BMB4(0), BMB5(0) and BMB6(1), BMB7(0), BMB8(0). It is evident that any number of additional device selectors may be assigned two digit octal codes (up to a total of 63 in decimal notation). The operation of each of the selector components such as 101, 114, 207, 208 in FIG. 2 and such as 100, 113, 302 and 303 in FIG. 3 will be apparent from the foregoing description.

In FIG. 2, branch cables as indicated at 285—288 leading from IOP cable 290 to selectors 101, 114, 207 and 208, respectively. The cable 290 is connected to the output of an IOP bus generator component 291 of the computer, and the cable 290 may comprise three conductors carrying respective pulses IOP1, IOP2, and IOP4 as described, for example, in *The Digital Small Computer Handbook*, supra, at pages 88—90, pages 221—223, and pages 426—427, and this description is incorporated herein by reference. The device selector components when enabled regenerate the respective IOP pulses as IOT command pulses. The positive or negative version of any of the successive regenerated pulses IOT1, IOT2 or IOT4 may be supplied via output lines such as indicated at 291—294 in FIG. 2. The output terminals in FIG. 2 to which conductors 291—294 are connected are designated by letters which correspond to the distinctive letters in the terminal designations utilized in the commercially available module W103. Thus, terminal S of selector 101 may supply an initially positive-going version of the 10T4 pulse, the T terminal of selector 100 may supply an initially negative-going 10T4 pulse, for example, and the terminal F of selector 113 may supply an initially negative-going 10T1 pulse. The timing of the 10T cycle is shown at page 425 of *The Digital Small Computer Handbook*, supra, and this disclosure is incorporated herein by reference.

In FIG. 3, the reference numeral 197 designates generally the cable extending between the accumulator terminals AC11 through AC0 of the computer and the successive gate components such as 104, 108, 300 and 301. As mentioned with reference to cable 130, the cable 197 may actually comprise successive lengths of multiconductor cable, for example connecting from component 301 to the computer, connecting between components 300 and 301, connecting between components 108 and 300, and connecting between components 104 and 108. Further lengths of cable may connect gate component 104 with gate components for other axes or for the axes of other machines, or separate buffering may be utilized in conjunction with a separate cable directly from the computer as will be apparent to those skilled in the art.

In FIG. 3 the conductors leading from components 104, 108, 300 and 301 have been assigned reference numerals 321—332, 341—345, 351—362 and 371—373. The reference numerals 321—327, 332 and 341, 344 and 345 have been applied to the corresponding conductors in FIGS. 1A and 1B. Conductors 321—332 connect with terminals AC11 through AC0 of the computer, conductors 341—344 connect with terminals AC11 through AC8, conductor 345 connects with terminal AC0, conductors 351 through 362 connect with terminals AC11 through AC0, conductors 371 and 372 connect with terminals AC11 and AC10, and conductor 373 connects with terminal AC0.

The structure and function of conductor cables 385—388 and conductors 391—394 in FIG. 3 will be apparent from the comparable discussion with respect to cables 285—288 and conductors 291'294 of FIG. 2

Operation of FIGS 4—8

FIGS. 4—8 illustrate improvements which have been made in the production of a commercial system now in successful operation In FIG. 4, conventional logic symbols have been utilized so that the operation of the circuit will be apparent to those skilled in the art. The inputs to the various gate circuits have been labeled in conformity with the designations of the outputs from the counting stages of FIGS 1A and 1B Thus, when the counterstage XL11 is in a "ONE" indicating condition, an output voltage of minus 3 volts appears at the "1" output terminal so that the output XL11 is "TRUE," and the "0" output $\overline{XL11}$ is "FALSE." Conversely, when the counterstage XL11 is in the "ZERO" representing condition, the output terminal $\overline{X111}$ will be at minus 3 volts, and the "1" output XL11 will be at ground potential.

The Tables A1 and A2 on the following pages will illustrate respectively the count values at which the various outputs in FIG. 4 will assume their "TRUE" condition, and the analog outputs from FIG. 5 as a function of different count values.

TABLE A1—CRITICAL COUNT RANGES IN FIG. 4

| Converter Control Output (FIG 4) | Range of Counts For Which Output is "TRUE" (−3 Volts) |
|---|---|
| | (Positive Counts) |
| High X Limit | 384 through 65535 |
| High X Limit | 0 through 383 |
| Prop X Limit | 0 through 63 |
| Low X Limit | 0, 1, 2, 3 |
| Prop X Jam | 64 through 383 |
| Low X Jam | 4 through 383 |
| | (Negative Counts) |
| High X Limit | −385 through −65536 |
| High X Limit | −1 through −384 |
| Prop X Limit | −1 through −64 |
| Low X Limit | −1, −2, −3, −4 |
| Prop X Jam | −65 through −384 |
| Low X Jam | −5 through −384 |

TABLE A2. ANALOG OUTPUT IN FIGURE 5 IN ARBITRARY UNITS) AS A FUNCTION OF COUNT

| Count range | Input to converter unit (N=−3 volts) (G=ground) | | | | | | Analog output | |
|---|---|---|---|---|---|---|---|---|
| | 1 | 2 | 4 | 8 | 16 | 32 | Total | Net* |
| 384 to 65535 | N | N | N | N | N | G | 32 | |
| 64 to 384 | G | G | G | G | G | G | 63 | 31 |
| 48 to 62 | G | G | N | G | G | G | 59 | 27 |
| 40 to 47 | G | G | G | N | G | G | 55 | 23 |
| 32 to 39 | G | G | N | N | G | G | 51 | 19 |
| 24 to 31 | G | G | G | G | N | G | 47 | 15 |
| 16 to 23 | G | G | N | G | N | G | 43 | 11 |
| 8 to 15 | G | G | G | N | N | G | 39 | 7 |
| 3 to 7 | G | G | N | N | N | G | 35 | 3 |
| 2 | N | G | N | N | N | G | 34 | 2 |
| 1 | G | N | N | N | N | G | 33 | 1 |
| 0 | N | N | N | N | N | G | 32 | 0 |
| −1 | G | G | G | G | G | N | 31 | −1 |
| −2 | N | G | G | G | G | N | 30 | −2 |
| −3 | G | N | G | G | G | N | 29 | −3 |
| −4 to −8 | N | N | G | G | G | N | 28 | −4 |
| −9 to −16 | N | N | N | G | G | N | 24 | −8 |
| −17 to −24 | N | N | G | N | G | N | 20 | −12 |
| −25 to −32 | N | N | N | N | G | N | 16 | −16 |
| −33 to −40 | N | N | G | G | N | N | 12 | −20 |
| −41 to −48 | N | N | N | G | N | N | 8 | −24 |
| −49 to −64 | N | N | G | N | N | N | 4 | −28 |
| −65 to −384 | N | N | N | N | N | N | 0 | −32 |
| −385 to 65536 | N | N | N | N | N | G | 32 | 0 |

*Bias equals minus 32 units.

Interconnections between FIGS. 4—8

To assist in identifying the connections between FIGS. 4 and 5, reference numerals 1441—1447 have been assigned in FIG. 4 and conductors 1441—1444, 1446 and 1447 are also indicated in FIG. 5. Conductor 1441 also connects with one input of components 1601 and 1602, FIG. 6. Conductor 1445 connects with an input to NOR gate 1663, FIG. 6. Conductor 1444 also connects with an input of component 1802, FIG. 8.

Conductor 1537 at the right in FIG. 5 connects with the movable tap of potentiometer 1633, FIG. 6. Conductor 1538 at the right in FIG. 5 connects with an input to the X-axis servo preamplifier 1711, FIG. 7.

In FIG. 6 the showing of certain Y-axis components corresponding to components 1601—1607, 1611, 1612, 1620—1626, 1631—1633 of the X-axis has been omitted since they are entirely similar to the X-axis components. As indicated at 1681, the Y-axis components would include MAN OUT and MAN IN switches similar to the MAN LEFT and MAN RIGHT switches 1682 and 1683. Conductor 1684 for the Y-axis components corresponds to conductor 1685. The conductor 1686 (INHIBIT MOVE) would connect to the Y-axis diode networks corresponding to 1611 and 1612.

In FIG. 6, at high limit counts, the relay 1620 serves to supply a saturating current of proper polarity to the conductor 1537, FIG. 5, to saturate preamplifier 1711, FIG. 7, with the proper polarity to correct for the existing error.

The structure and operation of the various Y-axis circuits correspond to that explained for the X-axis.

Figure 8:
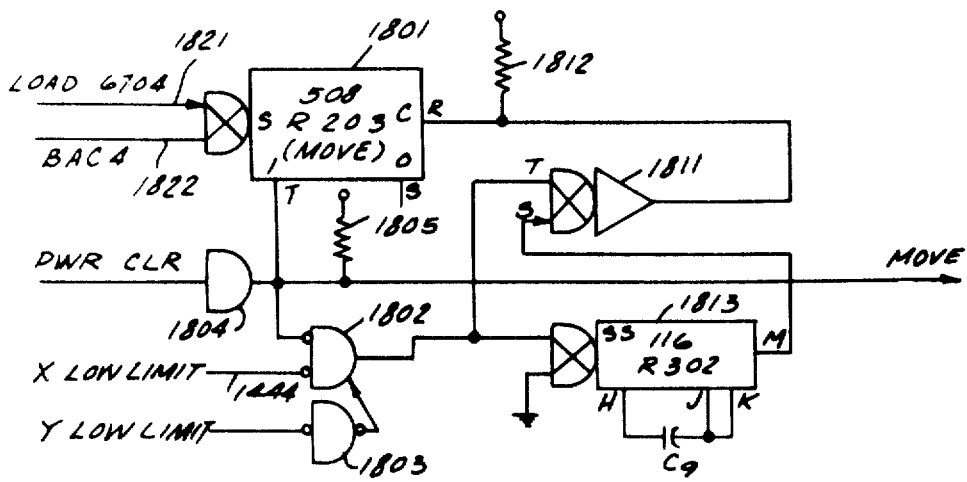
FIG. 8 is a diagrammatic showing of the control circuit for the MOVE flip-flop in the system.

In FIG. 8, the monostable 1813 may use a capacitor C9 of 38 microfarads. The circuit 1813 may be adjusted to provide a time delay of approximately 100 milliseconds, so that both the X and Y low limit inputs must be "TRUE" for at least 100 milliseconds before the MOVE flip-flop 1801 is reset.

Operation of FIGS. 4—8

After source 200 has loaded the digital command signals into the countercircuits such as shown in FIG. 1A and 1B via cable 130, conductors 221—232, 241—245, 251—262 and 271—273 and the gates 203—206, the digital-analog circuitry such as represented at 105, FIG. 1B, and as shown in detail in FIGS. 4 and 5, supplies a corresponding analog error signal to conductor 1538, FIG. 5, which is designated "To X Servo Ref." As shown in FIG. 1B, conductor 1538 connects with the X-Axis Servo circuits component 110 which together with the X-Axis Servodrive component 111 is shown in detail in FIG. 7.

As previously stated, at high limit counts, relay 1620, FIG. 6, serves to supply saturating current of proper polarity to the conductor 1537, FIG. 5. As seen at the right in FIG. 5, conductor 1537 connects with the output conductor 1538, serving to saturate preamplifier 1711, FIG. 7, with the proper polarity to correct for the existing error.

As shown in Table A2, (the right hand column) the analog output from FIG. 5 is reduced to a net value of plus 31 for the count range between 64 and 384, and then progressively reduces to net values of 37, 23, 19, 15, 11, 7, 3, 2, 1 and 0 for successive count ranges down to a count value of 0. Similarly where the counts are negative, the analog output has a net value of minus 32 for counts in the range from minus 65 to minus 384, and the net analog output decreases in magnitude toward zero as the count range approaches the count of 0.

As indicated in Table A1, the converter control output "Low X Limit" becomes "TRUE" for the range of counts including positive count values of 1, 2, and 3 immediately adjacent to the count value of 0 and including negative count values of minus 1, minus 2, minus 3 and minus 4, immediately adjacent to the count value of 0, the range including the count value of 0 also. The digital null circuit for the X-axis for uniquely sensing error counts which are within the predetermined null range of count values in the vicinity of 0 is shown in FIG. 4 and the output "Low X Limit" is designated by reference numerical 1444 at the right-hand side in FIG. 4.

The digital null circuit for each axis is responsive to error counts within the predetermined null range where "Low X Limit" is "TRUE" to establish a digitally determined null condition, namely the presence of a potential of minus 3 volts at conductor 1444 (see the heading for the right-hand column of table A1).

As shown in FIG. 8, when "X Low Limit" and "Y Low Limit" are both "TRUE" monostable delay component 1813 is actuated to begin its timing interval. If both X Low Limit and Y Low Limit are still TRUE at the completion of the timing interval, pulse amplifier 1811 is triggered to restore MOVE flip-flop component 1801 to the "CLEAR" condition, whereupon the "MOVE" output from flip-flop 1801 becomes "FALSE" to represent a move-complete signal.

As previously explained in describing the operation of FIGS. 1A and 1B, because of the operation of the null detector in circuitry 105, it is possible for the machine axis counters to have a count other than 0 registered therein at the time that the move-complete signal is generated. To deal with this possibility the count in the countercircuits is read by means of gates such as 104 and 108, FIGS. 1A, 1B and 3, and gates 300 and 301, FIG. 3, which supply outputs to conductors 321—332, 341—345, 351—362 and 371—373 leading to the computer accumulator via cable 197, FIG. 3. As previously explained, provision is made for the computer processor to algebraically combine the remainder in the counting stages with a succeeding command so as to provide a modified command signal which will correct for the error in the previous positioning operation.

We claim as our invention:

1. A control system comprising:

a source for supplying digital command signals representing a movement of a load with respect to X and Y-axes to a desired end point, X and Y-axis servo drives coupled to the load and responsive to respective X and Y-axis analog error signals for driving the load as a function of said analog error signals relative to the respective axes, a transducer coupled to each of said servo drives so as to be driven thereby as the load is moved relative to the corresponding axis and for generating motion pulses as a function of the movement of the load relative to the corresponding axis, a countercircuit for each axis connected with said source for registering the digital command signal for the axis and coupled with said transducer for the axis for receiving said motion pulses and operable to maintain an error count representing the displacement error of the load relative to the desired end point with respect to the axis, digital-analog circuitry for each axis connected with the corresponding countercircuit for providing an analog error signal in accordance with the magnitude of the error count in the corresponding countercircuit and connected with the corresponding servodrive for supplying said analog signal thereto for causing said servodrive to move the load toward the desired end point with respect to the axis, and a move-complete circuit for generating a move-complete signal, wherein the improvement comprises:

said digital-analog circuitry including a digital null circuit for each axis connected with the countercircuit for the axis and with the move-complete circuit and operable for uniquely sensing error counts registered by the corresponding countercircuit which are within a predetermined null range of count values in the vicinity of 0 including a count value of 0 and including positive and minus count values immediately adjacent to the count value of 0, and responsive to error counts within said predetermined null range to establish a digitally determined null condition, said move-complete circuit being responsive to the existence of a null condition for each axis simultaneously for a predetermined time interval to generate said move-complete signal.

2. The control system of claim 1 wherein the digital null circuit for each axis generates a predetermined logical signal level when in said digitally determined null condition, said move-complete circuit including a bistable component which is in one stable condition during a positioning operation and which is actuatable to a second stable condition to generate said move-complete signal said move-complete circuit including a logical AND gate having inputs receiving the respective predetermined logical signal levels for the respective axes and for transmitting an output signal so long as said predetermined logical signal levels are both present, a monostable delay circuit connected to the output of the AND gate for beginning a timing cycle in response to said output signals from the AND gate, and means connected to the output of the monostable delay circuit and to the output of the AND gate and to said bistable circuit for shifting the bistable circuit to the second stable condition in response to a delayed output from the monostable delay circuit providing the output signal is still present at the output of said AND gate.

3. A control system comprising:
a source for supplying digital command signals representing a movement of a load with respect to X and Y-axes to a desired end point X and Y-axis servo drives coupled to the load and responsive to respective X and Y-axis analog error signals for driving the load as a function of said analog error signals relative to the respective axes, a transducer coupled to each of said servo drives so as to be driven thereby as the load is moved relative to the corresponding axis and for generating motion pulses as a function of the movement of the load relative to the corresponding axis, a countercircuit for each axis connected with said source for registering the digital command signal for the axis and coupled with said transducer for the axis for receiving said motion pulses therefrom and operable to maintain an error count representing the displacement error of the load relative to the desired end point with respect to the axis, digital-analog circuitry for each axis connected with the corresponding countercircuits for providing an analog error signal in accordance with the magnitude of the error count in the corresponding countercircuit and connected with the corresponding servodrive for supplying said analog signal thereto for causing said servodrive to move the load toward the desired end point with respect to the axis, and a move-complete circuit for generating a move-complete signal, said digital-analog circuitry including a digital null circuit for each axis connected with said countercircuit for the axis and directly responsive to a zero count value in digital form in said countercircuit to establish a discrete logical signal level signalling a digitally determined null condition, said move-complete circuit including digital logic circuitry connected to the digital null circuits for the respective axes and responsive to the simultaneous existence of the digitally determined null condition for each axis to begin a timing cycle, said move-complete circuit being responsive to the simultaneous existence of said digitally determined null condition for each axis at the termination of the timing cycle to generate said move-complete signal.

4. A control system in accordance with claim 3 with said digital null circuit for each axis comprising logical AND circuitry with inputs connected to the respective stages of the countercircuit for responding to the zero count value in digital form in said countercircuit to establish said discrete logical signal level, said move-complete circuit comprising a logical AND circuit having inputs connected to the respective digital null circuits and a timing circuit connected with the output of the logical AND circuit for beginning a timing cycle when both inputs to said logical AND circuit are at said discrete logical signal level signalling said null condition.